(12) United States Patent  
Martin

(10) Patent No.: US 7,475,543 B2  
(45) Date of Patent: Jan. 13, 2009

(54) SYSTEM AND METHOD FOR CONVEYING THERMAL ENERGY

(76) Inventor: Kenneth Bruce Martin, 2170 N. Koolridge Way, Chino Valley, AZ (US) 86323

( * ) Notice: Subject to any disclaimer, the term of this patent is extended or adjusted under 35 U.S.C. 154(b) by 0 days.

(21) Appl. No.: 11/164,196

(22) Filed: Nov. 14, 2005

(65) Prior Publication Data

US 2007/0107431 A1    May 17, 2007

(51) Int. Cl.  
*B60K 16/00* (2006.01)

(52) U.S. Cl. .................................. 60/641.8; 60/641.15

(58) Field of Classification Search ............... 60/639, 60/675, 495, 496, 641.8–641.15  
See application file for complete search history.

(56) References Cited

U.S. PATENT DOCUMENTS

| | | | | |
|---|---|---|---|---|
| 3,509,716 | A | * | 5/1970 | Avery ........................... 60/675 |
| 3,962,873 | A | | 6/1976 | Davis |
| 3,966,634 | A | * | 6/1976 | Sacks ......................... 252/373 |
| 4,000,734 | A | | 1/1977 | Matlock et al. |
| 4,038,826 | A | * | 8/1977 | Shaw ....................... 60/641.14 |
| 4,055,948 | A | * | 11/1977 | Kraus et al. ................ 60/641.8 |
| 4,222,365 | A | * | 9/1980 | Thomson ..................... 126/400 |
| 4,311,010 | A | | 1/1982 | Wurmfeld |
| 4,467,958 | A | | 8/1984 | Yoshiwa et al. |
| 4,538,415 | A | | 9/1985 | Lebecque |
| 4,832,794 | A | | 5/1989 | Lyytinen |
| 5,052,921 | A | * | 10/1991 | Hemsath ..................... 432/121 |
| 5,125,233 | A | * | 6/1992 | Evanger et al. ............... 60/496 |
| 5,685,151 | A | | 11/1997 | Ross |
| 5,806,317 | A | | 9/1998 | Kohler et al. |
| 6,141,949 | A | * | 11/2000 | Steinmann ................... 60/772 |
| 6,170,562 | B1 | | 1/2001 | Knoblauch |
| 6,385,972 | B1 | | 5/2002 | Fellows |
| 6,387,221 | B1 | | 5/2002 | Schoenhard |
| 6,978,610 | B2 | * | 12/2005 | Carnahan ..................... 60/495 |
| 2002/0027132 | A1 | | 3/2002 | Black |
| 2003/0054214 | A1 | | 3/2003 | Noelscher |
| 2003/0201008 | A1 | | 10/2003 | Lawheed |
| 2004/0098987 | A1 | | 5/2004 | Raiko |
| 2004/0141539 | A1 | | 7/2004 | Delgado, Jr. et al. |
| 2005/0079070 | A1 | | 4/2005 | Prueitt et al. |
| 2005/0126170 | A1 | | 6/2005 | Litwin |
| 2006/0042244 | A1 | * | 3/2006 | Villalobos .................... 60/495 |

FOREIGN PATENT DOCUMENTS

DE    101 44 841 B9    10/2004  
EP    0 997 613 A1    5/2000

* cited by examiner

*Primary Examiner*—Hoang M Nguyen  
(74) *Attorney, Agent, or Firm*—Smell & Wilmer L.L.P.

(57) ABSTRACT

A system and method for conveying thermal energy using thermally conductive solid objects within a closed circuit.

15 Claims, 4 Drawing Sheets

SYSTEM AND METHOD FOR CONVEYING THERMAL ENERGY

FIELD OF INVENTION

The present invention generally relates to a system and method for conveying thermal energy and, more particularly, to a system and method for conveying thermal energy using thermally conductive solid objects. The present invention also relates to a system and method for converting solar energy and, more particularly, to a system and method for converting solar energy to thermal energy where solids are used to convey the thermal energy before converting it to electrical energy.

BACKGROUND OF INVENTION

Heat sinks are used to lower the temperature of electronic devices by dissipating heat into the surrounding air. For example, all computer processing units (CPUs) require heatsinks. Heatsinks with a fan are called active heat sinks and heatsinks without a fan are called passive heat sinks. Heatsinks for CPUs are typically made of an aluminum alloy and often have fins so that air can easily and quickly flow through them.

Thermal energy may be conveyed for a number or reasons—to dissipate heat generated in electronic devices and chemical reactions, to converting and generating other types of energy such as solar energy to electrical energy.

Solar energy has been collected and used for a number of purposes since the early 1800s. Solar energy can be captured and converted directly or indirectly into other forms of energy such as heat and electricity. However, the major drawbacks of using solar energy include the intermittent and variable manner in which the rise at the air's surface and the large area that is required to collect it at a useful rate.

Today, solar energy is used for a number of purposes including the heating of water for domestic use, space heating of buildings, drying agricultural products, and generating electrical energy. Solar energy can be used to produce electricity directly by using photovoltaic devices or indirectly using steam generators that employ solar thermal collectors to heat a working fluid. However, some of these systems for producing electricity from solar energy are costly and inefficient.

Use of an "active heatsink" that employs the movement of solid objects to convey thermal energy has several advantages over the fluid systems used to convey thermal energy. First, an active heatsink employing solid objects can function over a very large temperature range that does not require freezing or boiling. Second, an active heatsink employing solid objects can function at ambient pressure and may be much more cost effective. For example, systems using liquids often require pipes and fittings to be made of expensive high temperature alloys such as inconel or hastalloy. In addition, systems using liquids have small temperature ranges and the liquid turns solid when not heated, thereby requiring the solid to be melted before it can be used again.

Accordingly, there is a need for an efficient, cost effective alternative to conveying thermal energy using liquids that can be employed in a number of different applications.

SUMMARY OF INVENTION

The invention is generally directed to a system and method for conveying thermal energy that utilizes the movement of one or more thermally conductive solid objects. The system for conveying thermal energy may include a closed circuit, at least one thermally conductive solid object contained within the closed circuit, and means for moving the thermally conductive solid object throughout the closed circuit.

The thermally conductive solid objects may comprise many shapes and forms and, in one exemplary embodiment, may comprise a metal sphere made of a material having high thermal conductivity such as aluminum, copper, silver, and other metal alloys. The system for conveying thermal energy using the movement of one or more thermally conductive solid objects may also include a controller for controlling the movement of the solid objects within the closed circuit.

Means for moving the thermally conductive solid objects throughout the closed circuit may include an impeller or any other type of device capable of forcing, driving, or pushing the thermally conductive solid objects throughout the closed circuit. The closed circuit may comprise any number of shapes, elements, and configurations and, in one exemplary embodiment may comprise a plurality of tubular members.

The present invention is also directed to a method for conveying thermal energy which includes the steps of providing a closed circuit, providing at least one thermally conductive solid object within the closed circuit, heating the thermally conductive solid object within the closed circuit, and moving the thermally conductive solid object from one location to another within the closed circuit. The method may also include the step of controlling the movement of one or more thermally conductive solid objects within the closed circuit.

The invention also includes a system for converting solar energy which comprises a closed circuit, at least one solid object contained within, and movable throughout, the closed circuit, at least one solar collection device positioned around a portion of the closed circuit, an impeller or other device for moving one or more solid objects through the closed circuit, and a boiler enclosing at least a portion of the closed circuit. In one exemplary embodiment of the system, the solar collection device may be a parabolic reflector. The system may also include means for introducing and/or maintaining a predetermined amount of water in the boiler and means for retaining one or more of the solid objects within the portion of the circuit enclosed by the boiler.

In one exemplary embodiment of the system for converting solar energy, the solid object or objects may comprise a metal sphere having high thermal conductivity. The system for converting solar energy may further include a steam outlet from the boiler, a turbine rotatable by steam, and an electric generator to generate electricity.

BRIEF DESCRIPTION OF THE DRAWINGS

The present invention is hereafter described in conjunction with the following drawing figures, wherein like numerals denote like elements, and.

DETAILED DESCRIPTION

The following description is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention set forth in the appended claims. For example, in the context of the present invention, the system and method hereof find particular use in connection with converting solar energy into other forms of energy. The present invention, however, may be used to convey thermal energy in a wide variety of applications.

In general, the present invention provides a system and method for conveying thermal energy using solid objects, as discussed in further detail below. In general, the system includes a closed circuit, at least one thermally conductive solid object that is contained within the closed circuit and moveable throughout the closed circuit, and means for moving the thermally conductive solid object or objects to different locations or positions within the closed circuit. The movement of the thermally conductive solid objects within the closed circuit may be controlled by a controller.

Figure 1:
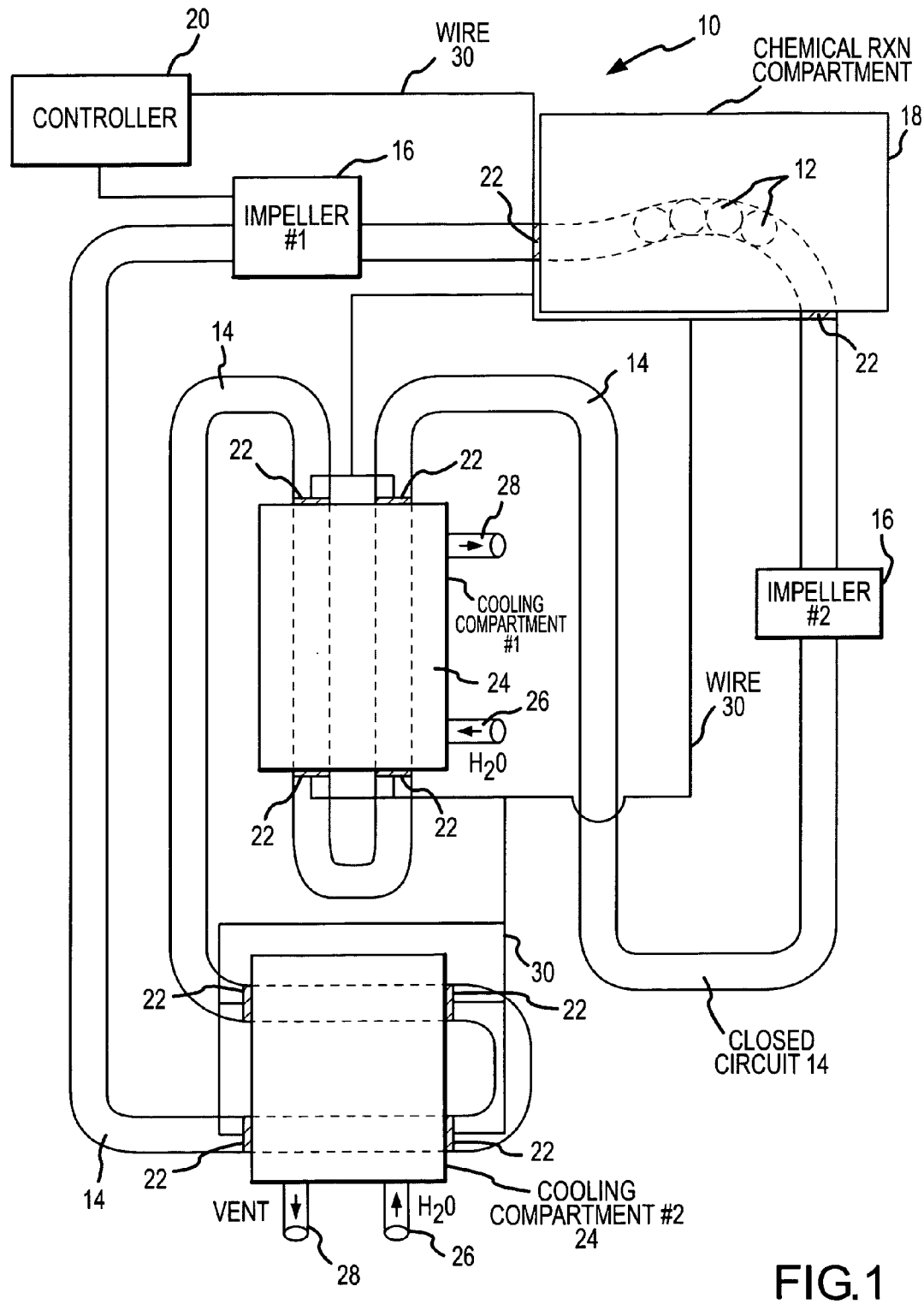
FIG. 1 shows a schematic of the system for conveying thermal energy using one or more thermally conductive solid objects.

Turning now to the figures, FIG. 1 illustrates a schematic of an exemplary system 10 for conveying thermal energy using one or more thermally conductive solid objects in accordance with the present invention. One or more thermally conductive solid objects 12 are contained within a closed circuit 14. The thermally conductive solid objects 12 may comprise metal spheres made of steel, aluminum, copper, silver, aluminum and copper bonded together, or other metal alloys that have high electrical conductivity in that most materials with high electrical conductivity also possess high thermal conductivity. Other materials with high thermal conductivity such as diamond may also be used for making the thermally conductive solid objects 12. However, the thermally conductive solid objects 12 may comprise any shape or configuration as long as they are transportable through some type of closed circuit.

Thermal conductivity is measured in W/mK with higher values having better conductivity. The thermal conductivity of steel is about 50 W/mK. The thermal conductivity of aluminum is much better at 205 W/mK. Aluminum is a good choice for the thermally conductive solid objects 12 of the present invention because it is inexpensive, easily extruded, and quickly milled. Aluminum may also be die cast and cold forged, and it is very light thereby facilitating its movement throughout the closed circuit 14. the thermal conductivity of copper is almost twice as high as aluminum at 400 W/mK. However, copper is heavier, more expensive, and cannot be extruded. Aluminum and copper may be bound together to form the thermally conductive solid objects 12 but the copper must be tightly bonded to the aluminum for good thermal transfer. Silver has a higher thermal conductivity than copper but only by about 10%. Pulverized silver is common ingredient in high-end thermal compounds. Pure silver has the highest electrical and thermal conductivity of all metals, and possesses the lowest contact resistance. Diamond actually has five times higher thermal conductivity than the best conducting metals.

The system 10 for conveying thermal energy also includes means for moving the thermally conductive solid objects 12 through the closed circuit 14 such as one or more impellers 16, or other types of devices capable of forcing, driving, or pushing the thermally conductive solid objects 12 through the closed circuit 14. One or more portions of the closed circuit 14 are contained within compartments which generate thermal energy such as chemical reaction compartment 18. A chemical reaction that generates thermal energy, or heat, may be carried out within chemical reaction compartment 18. The thermally conductive solid objects 12 contained within the portion of the closed circuit 14 contained within the chemical reaction compartment 18 absorb the thermal energy and are moved to other locations or areas within the closed circuit 14. The thermally conductive solid objects 12 move the thermal energy better than liquids.

The movement of the thermally conductive solid objects 12 within the closed circuit 14 may be controlled with a controller 20 that is capable of activating barriers 22 contained within the closed circuit 14 which are capable of confining the thermally conductive solid objects 12 within specific portions or sections of the closed circuit 14. For example, the barriers 22 located within the closed circuit 14 at those portions of the closed circuit 14 that exit or enter the chemical reaction compartment 18 may be activated so that the thermally conductive solid objects 12 are contained within that section of the closed circuit 14 that is contained within the chemical reaction compartment 18.

Cooling compartments 24 may also enclose one or more portions of the closed circuit 14. Cooling compartments 24 may include an inlet 26 for a coolant and an outlet 28 or vent for venting hot air or steam that is released from the cooling compartment 24. Once the thermally conductive solid objects 12 have collected the thermal energy created by the chemical reaction that took place in the chemical reaction chamber 18, the barriers 22 are removed and the thermally conductive solid objects 12 are moved through the closed circuit 14 via the impellers 16 to an area of the closed circuit that is enclosed within a cooling compartment 24. Once in the area of the closed circuit 14 enclosed within the cooling compartment 24, controller 20 may activate barriers 22 to retain the thermally conductive solid objects 12 within the area of the closed circuit contained within the cooling compartment 24. Once the coolant that is introduced into the cooling compartment 24 through inlet 26 has cooled the thermally conductive solid objects 12, the barriers 22 may be removed or retracted to move the thermally conductive solid objects 12 to other sections within the closed circuit 14. For example, the thermally conductive solid objects 12 may be moved to another cooling compartment 24 to undergo further cooling, or onto another or the same chemical reaction compartment 18 to absorb the thermal energy produced by another thermal reaction carried out within the chemical reaction compartment 18.

Closed circuit 14 may be comprised of a series of tubular members, a network of pipes or other passage-defining components, or a plurality of any other elements that provide a hollow, closed system in which the thermally conductive solid objects 12 can me moved. The closed circuit 14 may be comprised of any type of material that can withstand the functions of the compartments which comprise portions of the closed circuit 14. For example, the closed circuit 14 may be comprised of any material that can withstand the chemical reaction taking place within the chemical reaction compartment 18 which encloses a portion of the closed circuit 14. In addition, the closed circuit 14 must withstand the coolant materials and pressure contained within any of the cooling compartments 24 which enclose a portion of the closed circuit 14. Controller 20 may be connected to barriers 22 contained within the closed circuit 14 via an electronic wire system 30. Controller 20 may comprise a computer, programmable logic controller or other electrical processing device. The barriers 22 may be comprise any number of materials, shapes, and configurations that enable the thermally conductive solid objects 12 to be retained within sections of the closed circuit 14.

It will be understood by those skilled in the art that the system of the present invention for conveying thermal energy may be carried out in a number of applications in addition to the application described above where the system is used to remove and release thermal energy created by a chemical reaction. For example, the system 10 of the present invention may also be used to remove heat generated from the standard use of electronic components as well as for conveying and converting thermal energy as described in further detail below with reference to FIG. 2.

Figure 2:
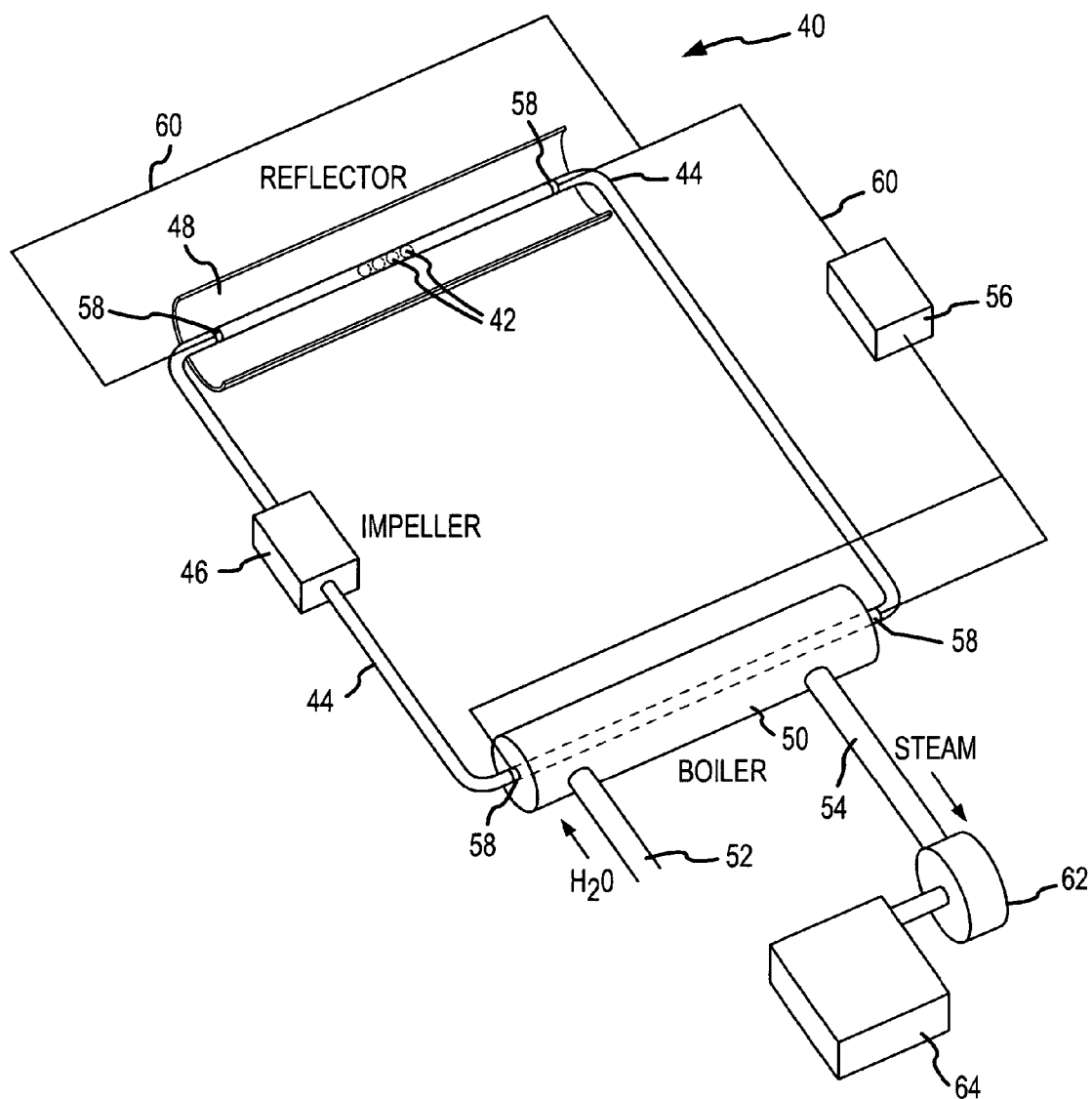
FIG. 2 is a schematic showing the system of the present invention for converting solar energy using one or more solid objects.

FIG. 2 is a schematic showing the system of the present invention used for converting solar energy using one or more solid objects. The system 40 for converting solar energy includes at least one thermally conductive solid object 42 contained within a closed circuit 44, an impeller 46 for moving the thermally conductive solid objects 42 through the closed circuit 33, at least one solar collection device 48 positioned around a portion of the closed circuit 44, and a boiler 50 enclosing at least a portion of the closed circuit 44. Boiler 50 includes an inlet 52 for a predetermined amount of water to be introduced and/or retained within the boiler 50 and an outlet 54 for steam to be released from the boiler 50 after the thermally conductive solid objects 42 are cooled.

System 40 may also include a controller 56 for controlling the movement of the thermally conductive solid objects 42 within the closed circuit 44 by employing barriers 58. Barriers 58 may be located within the closed circuit 44 at positions where the closed circuit 44 enters and exits the solar collection device 48 and the boiler 50. The controller 56 may be electrically connected to the barriers 58 via wires 60. The system may also include a turbine 62 that can be rotated by the steam exiting outlet 54 of the boiler 50 and an electrical generator 64 connected to the turbine 62 to generate electricity.

Thermally conductive solid objects 42 may be comprised of steel, aluminum, copper, silver, an alloy, an aluminum and copper alloy, diamond, or any other solid material that is a good thermal conductor. Thermally conductive solid objects 42 may also comprise a sphere shape or any other shape or configuration that enables the thermally conductive solid objects 42 to move throughout the closed circuit 44. Solar collection device 49 may comprise a parabolic reflector to concentrate the thermal energy in an area of the closed circuit 44 that contains the thermally conductive solid objects 42. One or more parabolic reflectors may be arranged in parallel and/or series configurations depending upon the configuration of the closed circuit 44. Other solar collection devices may also be used including a lens, such as a fresnel lens, or combinations of mirrors and lenses. Closed circuit 44 may comprise a plurality of tubular members or other elements that allow the thermally conductive solid objects 42 to move throughout the closed circuit 44.

Figure 3:
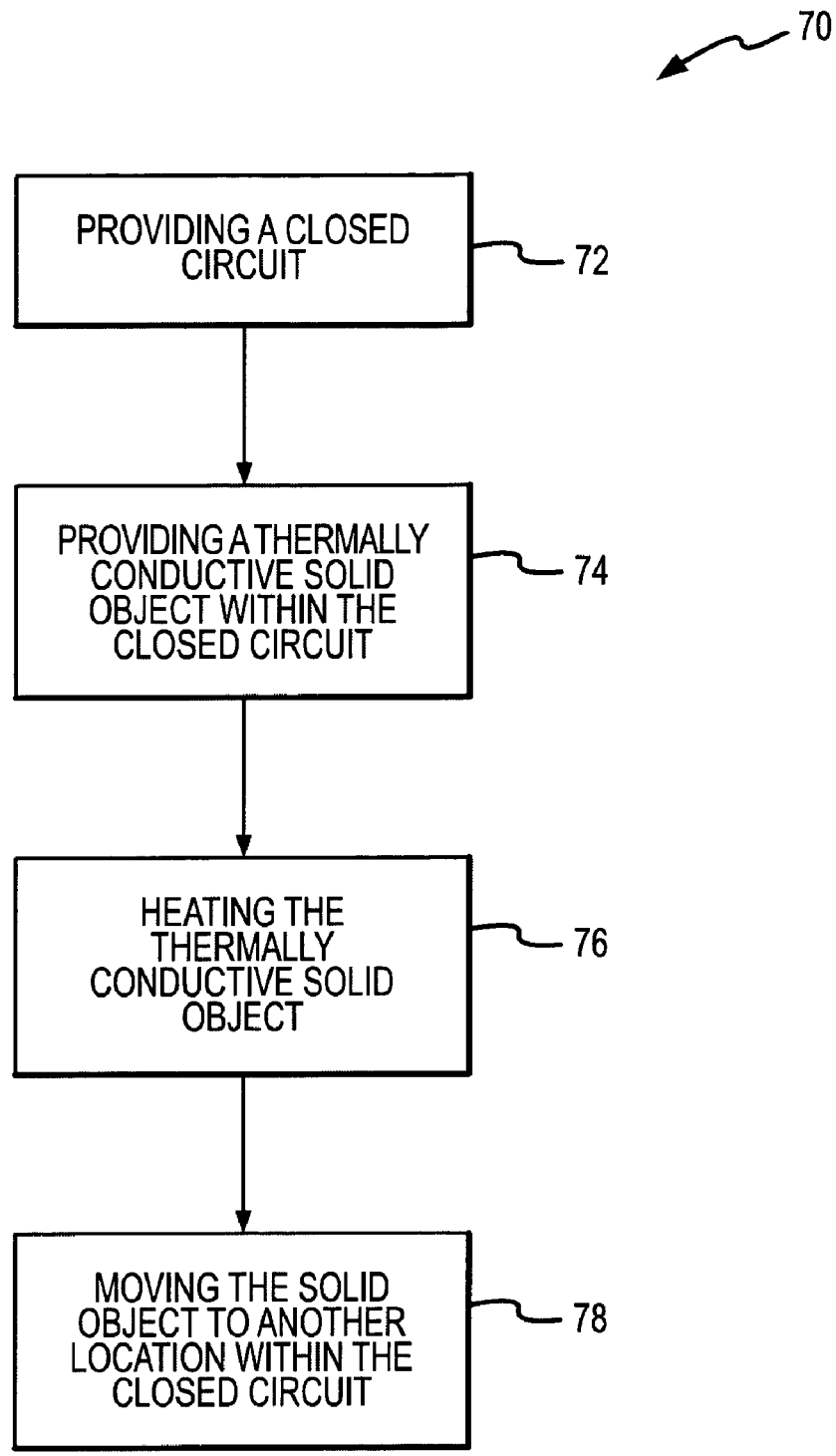
FIG. 3 is a flowchart illustrating a method for conveying thermal energy in accordance with the present invention.

The present invention is also directed to a method for conveying thermal energy as shown in FIG. 3. The method 70 for conveying thermal energy includes providing a closed circuit in step 72, providing at least one thermally conductive solid object within the closed circuit in step 74, heating the thermally conductive solid object or objects in step 76, and moving the thermally conductive solid objects to another location within the closed circuit in step 78. Method 70 may also include the step of controlling the movement of one or more thermally conductive solid objects within the closed circuit.

Figure 4:
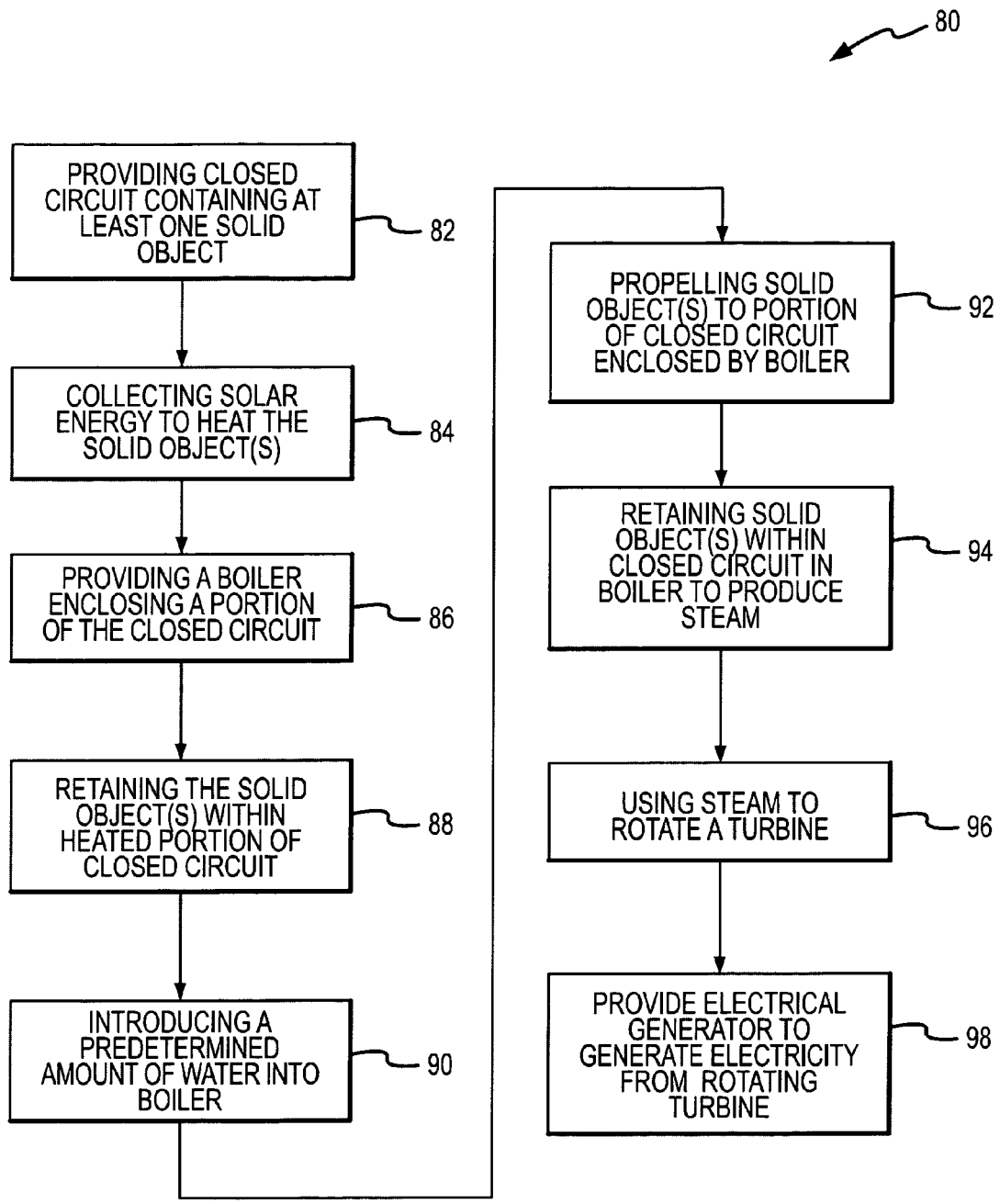
FIG. 4 is a flowchart illustrating a method for converting solar energy in accordance with the present invention.

FIG. 4 is a flowchart showing a method for converting solar energy in accordance with the present invention. The method 80 for converting solar energy includes providing a closed circuit containing at least one solid object in step 82, collecting solar energy to heat one or more solid objects in step 84, providing a boiler that encloses a portion of the closed circuit in step 86, retaining one or more of the solid objects within the portion of the closed circuit that is heated with solar energy in step 88, introducing a predetermined amount of water within the boiler in step 90, propelling the one or more solid objects through the closed circuit to the portion of the closed circuit enclosed by the boiler in step 92, and retaining the one or more solid objects within the portion of the closed circuit contained within the boiler to produce steam in step 94. The method 80 may also include rotating a turbine with the steam in step 96 and providing an electrical generator to generate electricity from the rotating turbine in step 98.

It will be understood by those skilled in the art that the steps in methods 70 and 80 may vary yet still produce the same result of conveying thermal energy to achieve a variety of applications including the application of converting solar energy into electrical energy.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for converting solar energy comprising:
   a closed circuit comprising a series of tubular members and a plurality of barriers contained within the series of tubular members;
   at least one solid object contained within, and moveable throughout, the closed circuit;
   a controller capable of activating the plurality of barriers;
   at least one solar collection device positioned around a portion of the circuit;
   an impeller for moving said at least one solid object through the closed circuit; and
   a boiler enclosing at least a portion of the circuit.

2. The system of claim 1 wherein said at least one solid object comprises a metal sphere.

3. The system of claim 2 wherein the metal sphere comprises at least one of a steel, an aluminum, a copper, a silver, an aluminum and copper alloy, a metal alloy, and a diamond material.

4. The system of claim 1 wherein said at least one solid object comprises a plurality of unconnected metal spheres wherein each sphere comprises at least one of a steel, an aluminum, a copper, a silver, an aluminum and copper alloy, a metal alloy, and a diamond material.

5. The system of claim 1 wherein said at least one solar collection device comprises a parabolic reflector.

6. The system of claim 1 further comprising means for at least one of introducing and retaining a predetermined amount of water within the boiler.

7. The system of claim 1 wherein the plurality of barriers are capable of retaining said at least one solid object within the portion of the circuit enclosed by the boiler.

8. The system of claim 1 further comprising:
   a steam outlet from said boiler;
   a turbine that can be rotated by steam; and
   an electrical generator to generate electricity.

9. A method for converting solar energy comprising the steps of:

providing a closed circuit containing a plurality of barriers and at least one solid object;

collecting solar energy to heat at least a portion of the closed circuit;

providing a boiler that encloses a portion of the closed circuit;

retaining said at least one solid object within the portion of the closed circuit that is heated with solar energy by activating the plurality of barriers;

introducing a predetermined amount of water into the boiler;

propelling the one or more solid objects through the closed circuit to the portion of the closed circuit enclosed by the boiler; and retaining the solid object within the portion of the circuit contained within the boiler to produce steam by activating the plurality of barriers.

10. The method of claim 9 further comprising the steps of:

rotating a turbine with the steam; and providing an electrical generator to generate electricity from the rotating turbine.

11. The method of claim 9 wherein the step of providing a closed circuit comprises the step of providing a plurality of tubular members.

12. The method of claim 9 wherein the step of providing a closed circuit comprises the step of providing a closed circuit containing at least one solid metal sphere.

13. The method of claim 9 wherein the step of collecting solar energy to heat at least a portion of the closed circuit comprises the step of positioning at least one solar collection device around a portion of the circuit.

14. The method of claim 13 wherein the step of positioning at least one solar collection device comprises the step of positioning at least one parabolic reflector around a portion of the circuit.

15. The method of claim 9 further comprising the step of controlling the movement of said at least one solid metal object within the closed circuit by activating the plurality of barriers.

* * * * *